US011573931B2

(12) United States Patent
Niddam et al.

(10) Patent No.: US 11,573,931 B2
(45) Date of Patent: Feb. 7, 2023

(54) SMART NEAR-REAL-TIME FOLDER SCAN BASED ON A BREADTH FIRST SEARCH

(71) Applicant: Microsoft Technology Licensing, LLC, Redmond, WA (US)

(72) Inventors: Itamar Niddam, Tel Aviv (IL); Ran Brosh, Hod Hasharon (IL); Saar Arbeli, Ramat Gan (IL); Boris Shubaev, Netanya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 204 days.

(21) Appl. No.: 17/154,833

(22) Filed: Jan. 21, 2021

(65) Prior Publication Data

US 2022/0229817 A1 Jul. 21, 2022

(51) Int. Cl.
| | |
|---|---|
| *G06F 16/00* | (2019.01) |
| *G06F 16/182* | (2019.01) |
| *G06F 16/16* | (2019.01) |
| *G06F 16/14* | (2019.01) |
| *G06F 9/455* | (2018.01) |

(52) U.S. Cl.
CPC ...... *G06F 16/1824* (2019.01); *G06F 9/45558* (2013.01); *G06F 16/148* (2019.01); *G06F 16/156* (2019.01); *G06F 16/16* (2019.01); *G06F 2009/45595* (2013.01)

(58) Field of Classification Search
CPC ...... G06F 16/16; G06F 16/148; G06F 16/156; G06F 16/1824

USPC .......................................................... 707/827
See application file for complete search history.

(56) References Cited

U.S. PATENT DOCUMENTS

| | | | | |
|---|---|---|---|---|
| 5,592,654 | A * | 1/1997 | Djakovic | G06F 3/1285 718/100 |
| 7,275,063 | B2 * | 9/2007 | Horn | G06F 7/08 707/999.102 |
| 9,558,465 | B1 * | 1/2017 | Arguelles | G06F 11/3452 |
| 9,697,101 | B1 * | 7/2017 | Chen | H04L 67/02 |
| 9,866,634 | B1 * | 1/2018 | Choy | G06F 16/1824 |
| 11,327,966 | B1 * | 5/2022 | O'Krafka | G06F 11/1471 |
| 2004/0177319 | A1 * | 9/2004 | Horn | G06F 16/289 715/201 |
| 2005/0015763 | A1 * | 1/2005 | Alexander, III | G06F 9/546 718/100 |
| 2006/0085412 | A1 * | 4/2006 | Johnson | G06F 16/256 |
| 2006/0218560 | A1 * | 9/2006 | Dadiomov | G06F 9/546 719/314 |

(Continued)

*Primary Examiner* — Ashish Thomas
*Assistant Examiner* — Rezwanul Mahmood
(74) *Attorney, Agent, or Firm* — Fiala & Weaver P.L.L.C.

(57) ABSTRACT

In response to a folder event received for a first folder, a first work item is dequeued from an ID queue and metadata of the first folder, and immediate children of the first folder, is fetched and enqueued as work items in a metadata queue. If further first folder children remain to be scanned, the first work item is updated with child IDs for each immediate child of the first folder that is a folder, and it is inserted into the ID queue. In a second pass, a child ID is dequeued and metadata of immediate children of the folder associated with the child ID is fetched and enqueued as work items in the metadata queue. The second pass is repeated for all child IDs in the updated work item. This process is repeated for each generation of children of the first folder or until a specified limit is met.

20 Claims, 8 Drawing Sheets

(56) References Cited

U.S. PATENT DOCUMENTS

| | | | |
|---|---|---|---|
| 2006/0253501 A1* | 11/2006 | Langan | G06F 16/178 |
| 2009/0228505 A1* | 9/2009 | Jones | G06F 16/00 |
| | | | 707/E17.049 |
| 2009/0271412 A1* | 10/2009 | Lacapra | G06F 16/178 |
| 2010/0325219 A1* | 12/2010 | Vasters | H04L 51/00 |
| | | | 709/206 |
| 2013/0336472 A1* | 12/2013 | Fahlgren | H04M 3/523 |
| | | | 379/266.01 |
| 2014/0040191 A1* | 2/2014 | Beddoe | G06F 16/178 |
| | | | 707/610 |
| 2014/0046987 A1* | 2/2014 | Harward | G06F 9/526 |
| | | | 707/827 |
| 2015/0026294 A1* | 1/2015 | Hiller | H04L 67/63 |
| | | | 709/217 |
| 2015/0339324 A1* | 11/2015 | Westmoreland | G06V 40/161 |
| | | | 707/733 |
| 2015/0370874 A1* | 12/2015 | Bansal | G06F 9/5055 |
| | | | 707/756 |
| 2017/0286229 A1* | 10/2017 | Cheung | G06F 16/1774 |
| 2018/0101546 A1* | 4/2018 | Krasnow | G06F 16/1734 |
| 2018/0261307 A1* | 9/2018 | Couse | G16H 80/00 |
| 2019/0166200 A1* | 5/2019 | Ciltone | G06F 3/0659 |
| 2019/0370061 A1* | 12/2019 | Shah | G06F 9/4881 |
| 2020/0053204 A1* | 2/2020 | Kamas | H04M 15/00 |
| 2020/0133791 A1* | 4/2020 | Liu | G06F 11/1448 |
| 2020/0250136 A1* | 8/2020 | Ballal | G06F 16/185 |
| 2021/0099543 A1* | 4/2021 | Cooney | G06F 16/182 |
| 2021/0184833 A1* | 6/2021 | Srivastava | H04L 9/0618 |
| 2022/0131879 A1* | 4/2022 | Naik | H04L 63/1416 |
| 2022/0138150 A1* | 5/2022 | Chmiel | G06F 3/065 |
| | | | 707/649 |
| 2022/0229817 A1* | 7/2022 | Niddam | G06F 9/45558 |

* cited by examiner

SMART NEAR-REAL-TIME FOLDER SCAN BASED ON A BREADTH FIRST SEARCH

BACKGROUND

Applications, resources, and data may be accessible to computers over one or more networks at one or more servers. Storage devices at such servers may be referred to as "network based storage," and the servers may be referred to as "network based servers." "Cloud storage" (also known as "cloud based storage) is a form of network-based storage where data can be stored at and be accessed from remote storage devices at servers that are accessible over the Internet. "Cloud computing" refers to the on-demand availability of computer system resources (e.g., applications, services, processors, storage devices, file systems, databases, etc.) over the Internet and data stored in cloud storage. Servers hosting cloud based resources may be referred to as "cloud based servers" (or "cloud servers").

Various cloud-based file systems (e.g., SharePoint®, DropBox®, Google® Drive, etc.) provide file hosting services such as file storage, file synchronization, document management, etc. These services allow users to create, access, edit, share, and/or collaborate with other users on files and folders. Cloud application security services (e.g., data loss prevention services) may monitor user's activities with respect to the files and folders and generate analytics to identify cyberthreats and control data travel in the cloud. An activity that involves accessing a file or a folder may prompt the security service to review the activity against policies that apply to the accessed file or folder. For example, a policy may be configured that excludes certain users from collaborating on a file. The security service may track activities occurring in a customer's cloud account and detect a breach of the policy by an unauthorized user accessing the protected file. The security system may then notify the customer that the policy has been violated.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods performed by a computer program executing on a computing device, and systems that are configured to perform such methods, are described herein. In one aspect, a method is performed in a cloud server for enqueuing metadata of children of a first folder associated with a folder event. The method includes, in a first pass: dequeuing, from a first persistent queue, a first work item associated with the folder event and fetching first metadata of the first folder and of immediate children of the first folder. The immediate children comprise at least one of a second folder or a file. The method further includes creating a second work item comprising the fetched first metadata and enqueuing the second work item to a second persistent queue. In response to determining that the first pass did not complete scanning children of the first folder, the first work item is updated for each second folder of the immediate children by adding a child folder identifier (ID) into an internal queue of the first work item. The updated first work item is inserted into the first persistent queue. In a second pass, the method further includes dequeuing, from the first persistent queue, a child folder ID of the internal queue for a second folder of the immediate children. Second metadata of immediate children of the second folder of the immediate children of the first folder is fetched based on the child folder ID. A third work item is created where the third work item comprises the fetched second metadata, and the third work item is enqueued to the second persistent queue.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
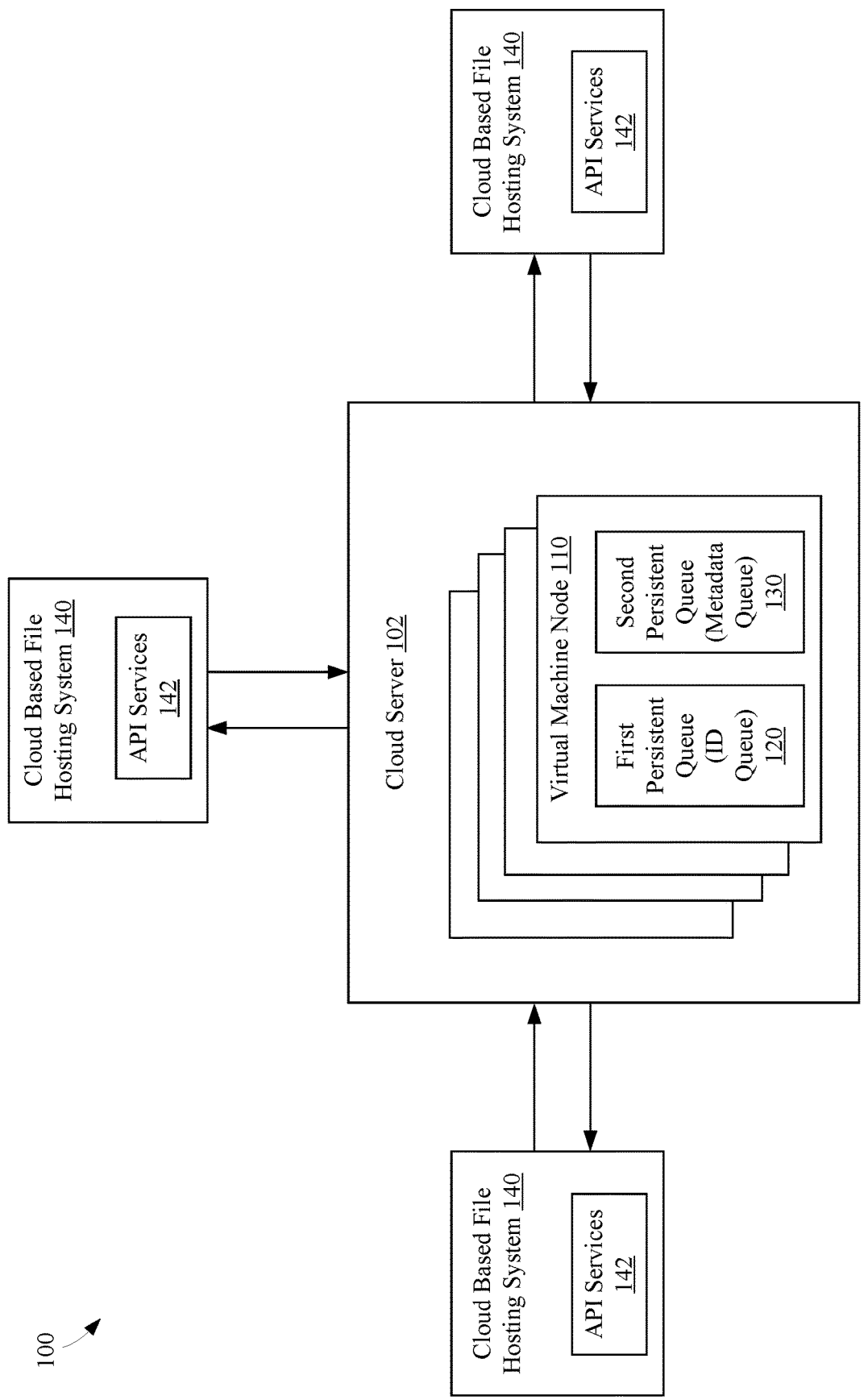
FIG. 1 is a block diagram of a cloud based folder scanning system for queuing file and folder metadata from a cloud based file hosting system in a persistent queue in response to a folder event, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, cloud application security systems may offer data loss prevention services for customers. The present disclosure provides methods and systems for a near-real-time folder scanner that may be utilized for data loss prevention services or other applications. Such a scanner may track activities in file hosting systems that occur in customers' cloud accounts (e.g., in software as a service (SaaS) accounts). The tracked activities may comprise events received for files and/or folders, such as for sharing, editing, creating, or adding a collaborator to a file and/or a folder. For example, a folder event may trigger a status update process on the folder itself and its children (e.g., direct and indirect children including one or more generations of sub-files and/or sub-folders). In some embodiments, a folder may be associated with a vast number of sub-files and/or sub-folders. Scanning such folder children may consume numerous resources in terms of processing time and the number of application programming interface (API) calls made to the cloud based file hosting system for metadata. To avoid potential latency, the depth of a scan may be limited to a certain number of generation(s) of children, or there may be a limitation on the number of files allowed to be scanned in response to a folder event before the scanning process is stopped. In some embodiments, the process may continue to complete the scanning of files in a folder even after the number of files allowed to be scanned has been reached.

In order to handle high loads of folder events (e.g., thousands of events per second) from the same file hosting service account, in parallel (e.g., each using the same bandwidth from the file hosting service), a breadth first search (BFS) process may be divided into small steps. For example, every iteration of the BFS process may update a work item state and re-send the updated work item to a queue, in order to distribute the required API calls over time and improve fairness among the different near-real-time events. Moreover, the limitations (e.g., scan depth, total count of files in scan, etc.) may be specified and may be adjusted dynamically, in order to reduce latency in handling a near-real-time event. These technical improvements allow fast and full coverage of the scope of near-real-time events that are created in customers' cloud accounts.

A cloud server may comprise one or more virtual machine (VM) nodes that may function as file and/or folder scanners. The VM node(s) may be configured to detect file and/or folder events received from one or more a third party systems (e.g., cloud based file hosting systems services). Generally speaking, the VM node(s) may convert an event into a work item that may be placed in a task queue (i.e., a first persistent queue or identifier (ID) queue). If the event represents only file based activities, the event may include metadata corresponding to the affected file(s), or a VM node may fetch metadata associated with the file(s). For example, the VM node may issue an API call to the file hosting system that reported the event, and in response, receive the associated metadata from the file hosting system. The VM node may then create a second work item comprising the metadata (i.e., metadata work item) and place it in a test queue (e.g., in a second persistent queue or metadata queue). If the event represents folder activity (i.e., root folder activity), the VM node may scan the root folder and children of the root folder, including any files and/or folders that may be located inside the root folder. In other words, the VM node may fetch metadata for the root folder and the children of the root folder, create a second work item comprising the fetched metadata (i.e., a metadata work item), and place the second work item in the second persistent queue. For each child folder of the root folder, the same process is performed including: fetching metadata of the children of the child folder (including file and/or folder metadata), placing the fetched metadata in a metadata work item, and enqueuing the metadata work item in the second persistent queue. Once this process is completed for each immediate child folder of the root folder, the process may be repeated again for each successive generation of folder children. However, the scanning process may be throttled or halted before the entire structure of sub-folders and sub-files are scanned, according to limitation parameters that may be configured in the system. For example, the depth of scanning from a root folder into levels or generations of children may be limited, or a limitation on the number of files allowed to be scanned for a folder event may be configured in the system. In some embodiments, the limits may be dynamically adjusted by the system to allow for completion of a full scan of a sub-folder (e.g., to avoid a partial folder scan). Moreover, scans for sub-files and/or sub-folders of a root folder may be broken down into multiple iterations of smaller scans, where each iteration has a specified number of allowed API calls. This limitation on API calls may be imposed by the file hosting system. In this manner, a breadth first searching (BFS) method may be implemented in the folder scanning process while system resources, such as processing time and the number of API calls sent to the file hosting systems, and potential latency in other events handling are managed with the configured or dynamically adjusted limitations.

As described above, the structure within a folder may be complex. The folder may comprise files and/or inner folders (i.e., sub-files and/or sub-folders), and those inner folders might also comprise files and inner folders and so on (e.g., as in a tree structure). Therefore, the scanning process described herein may walk through multiple generations of children of a root folder to find the sub-files and sub-folders, and create new metadata work items for each of them, to be enqueued to the second persistent queue (i.e., the metadata queue). By placing the metadata work items into the second persistent queue, the metadata work items may be available to be fed into a pipeline, or may be otherwise processed, to examine the metadata and detect possible policy violations associated with a file or folder, for example, by a security application such as a data loss prevention application.

In general, a user may take an action with respect to a file or folder of a cloud based file hosting system and the action may trigger an event that may be sent to a VM node. If it is a folder event, the VM node may walk through a tree structure comprising multiple levels sub-folders and/or sub-files, gather metadata for each sub-folder and sub-file, and enqueue corresponding metadata work items to the second persistent queue. Then policies may be tested against the metadata and policy violations may be determined. For example, if a policy indicates that only users listed as collaborators of a folder are allowed to change the content of a file in the folder, the security system may compare the users listed as collaborators in the metadata to a user reported in an event as having changed the content of the file, determine that the user is not a collaborator, and report to a customer that a policy violation occurred.

Embodiments for near-real-time folder scans based on a breadth first search may be implemented in various ways. For example, FIG. 1 is a block diagram of a cloud based folder scanning system 100 for queuing file and folder metadata from a cloud based file hosting system in a persistent queue in response to a folder event, according to an example embodiment. As shown in FIG. 1, system 100 includes a cloud server 102 and three cloud based file hosting systems 140. Cloud server 102 includes virtual machine node 110, which comprises first persistent queue 120 and second persistent queue 130. Each of the cloud based file hosting systems 140 comprises an application programming interface (API) service 142. System 100 is described in detail as follows.

Note that although embodiments are described herein in a cloud computing context (e.g., with respect to cloud based servers, etc.), embodiments are also applicable to other network based implementations.

As described in more detail below with respect to FIG. 13, cloud server 102 and each of the cloud based file hosting systems 140 may comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a dual screen phone; a Microsoft® Windows phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

Cloud server 102 may comprise a plurality of VM nodes that are similar or substantially the same as VM node 110, and each of the nodes may be referred to as VM node 110. VM node 110 may be communicatively coupled to, and may provide file and folder scanning services to, one or more of the cloud based file hosting systems 140. For example, VM node 110 may be configured to track activities performed on files and or folders that are stored in file hosting systems 140 (e.g., sharing, editing, creating, deleting, or adding a collaborator to a file or a folder). Such an activity (i.e., a folder event) may trigger a status update on the folder that underwent the activity and its direct and indirect children (i.e., direct or indirect sub-folders and sub-files). In this regard, VM node 110 may be configured to receive file and folder events from one or more cloud based file hosting systems 140, for example, the events may be received in response to a request for events that is submitted via an API call to an API service 142. The request for events may be limited to events that occurred during specified time frame (e.g., the last 30 minutes). Moreover, VM node 110 may be configured to fetch file and/or folder metadata utilizing API calls to one or more API services 142 of the cloud based file hosting systems 140.

First persistent queue 120 may be configured to store raw file and/or folder event information that may be received from a cloud based file hosting system 140. For example, first persistent queue 120 may store work items that include enough information about a file or a folder (e.g., a file ID or folder ID) to perform a scan in a cloud based file hosting system 140 for metadata associated with the file, folder, and/or children of the folder. The work items of first persistent queue 120 may be updated with folder ID information of folder children that is received from a cloud based file hosting system 140 when the metadata is retrieved for the folder children. First persistent queue 120 may be referred to as ID queue 120.

Second persistent queue 130 may be configured to store enriched file and/or folder event information comprising file and/or folder metadata. The metadata may be retrieved from cloud based file hosting system 140 during a scan, for work items stored in the first persistent queue 120. The second persistent queue 130 may be referred to as metadata queue 130.

Figure 2:
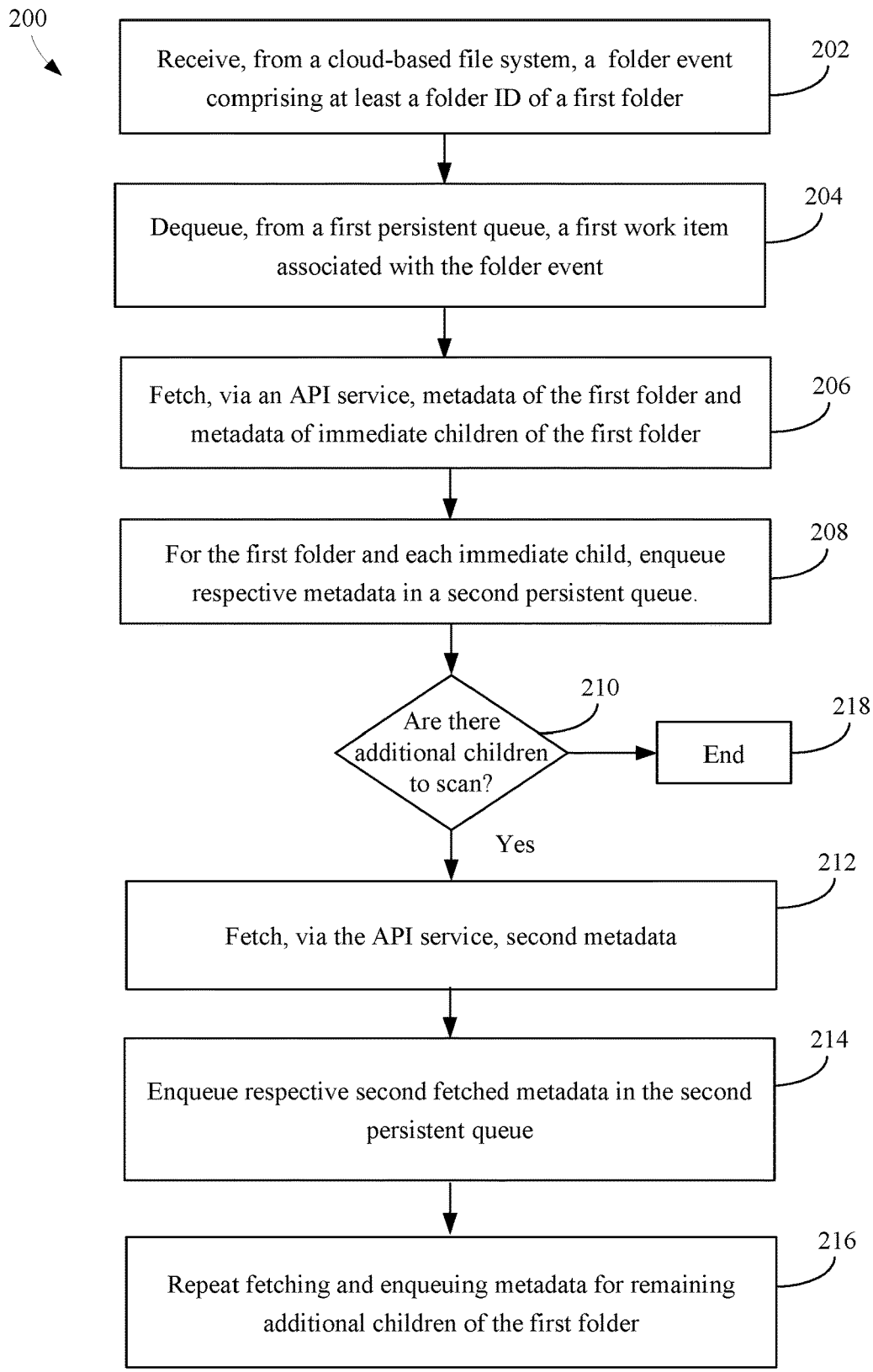
FIG. 2 is a flowchart of a method in a cloud server for performing a breadth first search for file and folder metadata in response to a folder event, and enqueuing the metadata in a persistent queue, according to an example embodiment.

Virtual machine node 110 may operate in various ways to perform its functions. For instance, FIG. 2 is a flowchart 200 of a method in a cloud server for performing a breadth first search for file and folder metadata in response to a folder event, and enqueuing the metadata in a persistent queue, according to an example embodiment. In an embodiment, VM node 110 may be configured to operate according to flowchart 200. Flowchart 200 is described as follows with reference to FIGS. 1 and 3.

Figure 3:
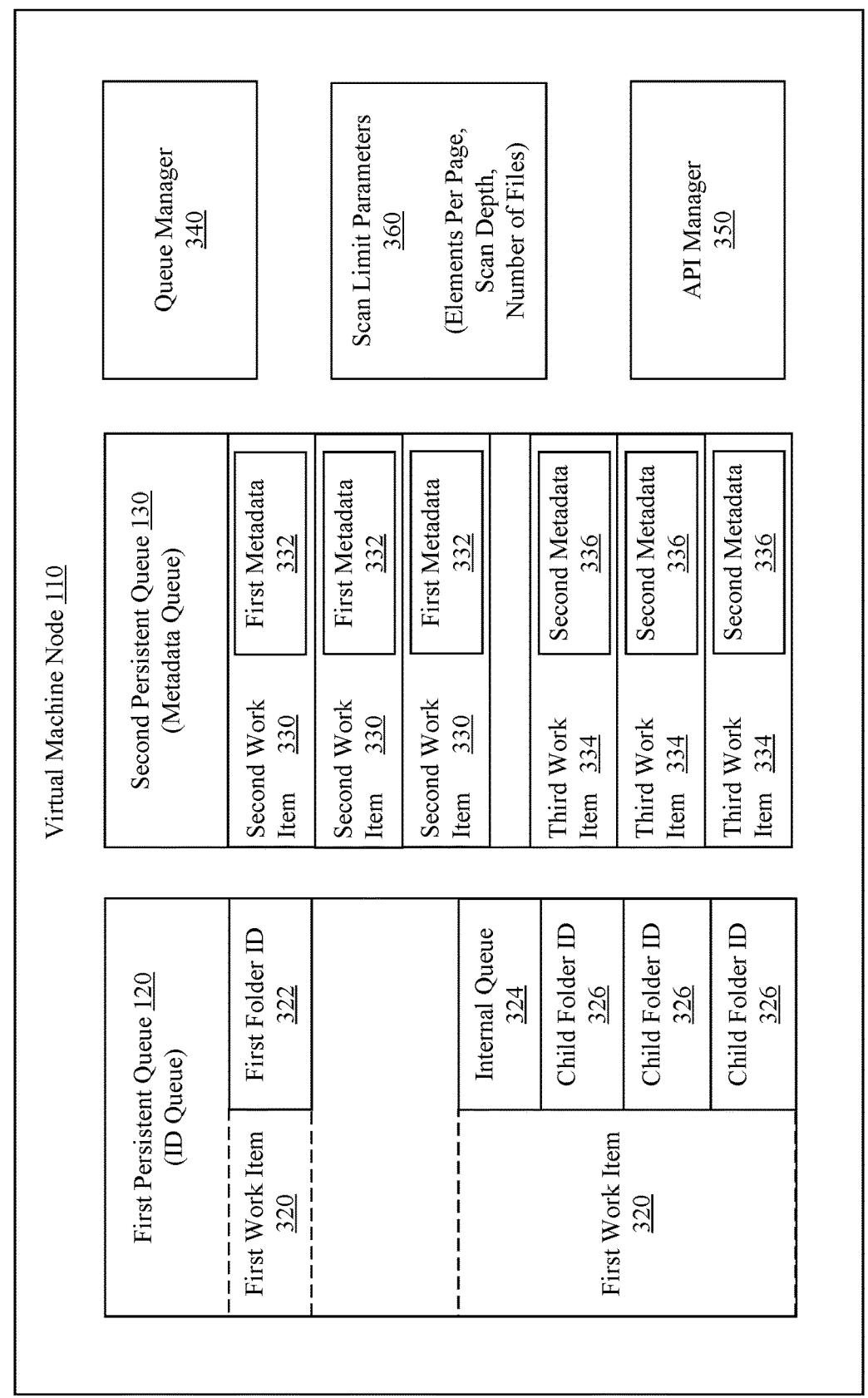
FIG. 3 is a block diagram of a system with a VM node configured to perform a breadth first search for file and folder metadata in response to a folder event, and enqueue the metadata in a persistent queue, according to an example embodiment.

FIG. 3 is a block diagram of a system 300 with a VM node configured to perform a breadth first search for file and folder metadata in response to a folder event, and enqueue the metadata in a persistent queue, according to an example embodiment. As shown in FIG. 3, system 300 comprises VM node 110. VM node 110 comprises first persistent queue 120, second persistent queue 130, a queue manager 340, an API manager 350, and scan limit parameters 360. First persistent queue 120 may comprise a first work item 320 that includes a first folder ID 322 or an internal queue 324. Internal queue 324 comprises one or more child folder IDs 326. Second persistent queue 130 may comprise a second work item 330 comprising first metadata 332 and a third work item 334 comprising second metadata 336. In some embodiments system 300 may be implemented in system 100. For purposes of illustration, system 300 is described in detail as follows with respect to flowchart 200 of FIG. 2.

Flowchart 200 begins with step 202. In step 202, a folder event comprising at least a folder ID of a first folder is received from a cloud-based file system. For example, an action may be performed on a folder that is stored in cloud based file hosting system 140. The folder (i.e., the first folder) may be associated with first folder ID 322. In response to the action, cloud based file hosting system 140 may issue a folder event to cloud server 102 comprising first folder ID 322. In some embodiments, API manager 350 may transmit a request for events via an API call to API service 142. Queue manager 340 may be configured to receive the event and create first work item 320 comprising first folder ID 322. Queue manager 340 may be further configured to enqueue first work item 320 in first persistent queue 120 (i.e., ID queue 120). First folder ID 322 may be utilized to scan cloud based file hosting system 140 for metadata of the first folder (associated with first folder ID 322) and metadata of any immediate children of the first folder (e.g., children comprising sub-folders and/or sub-files of the first folder).

In step 204, a first work item associated with the folder event may be dequeued from a first persistent queue. For example, queue manager 340 may be configured to dequeue first work item 320 from first persistent queue 120 and provide first folder ID 322 to API manager 350.

In step 206, metadata of the first folder and of the immediate children of the first folder may be fetched via an API service. For example, API manager 350 may be configured to transmit a request comprising first folder ID 322 to API services 142 in cloud based file hosting system 140, and request metadata associated with the first folder identified by first folder ID 322. API services 142 may be configured to transmit first metadata 332 associated with the first folder and a respective first metadata 332 associated with each of immediate children of the first folder, including sub-files and/or sub folders, if any, to API manager 350.

In step 208, for the first folder and each immediate child of the first folder, enqueue respective metadata in a second persistent queue. For example, queue manager 340 is configured to create a respective second work item 330 for each of the first folder and each of the immediate children of the first folder, and insert respective first metadata 332 of each of the first folder and each of the immediate children of the first folder into each corresponding second work item 330. Queue manager 340 is further configured to enqueue each second work item 330 comprising respective first metadata 332 into second persistent queue 130.

In step 210, in instances when there are additional children descended from the first folder to scan, the steps proceed to step 212. For example, if queue manager 340 determines that any of the immediate children of the first folder includes a folder that may have sub-folders and/or sub-files, and a limit has not been reached, the steps proceed to step 212. Otherwise, flowchart 200 ends at step 218.

As described in more detail below, the depth of scanning generations of children of the first folder, or the number of files scanned during flowchart 200 may be limited according to configured settings, in order to control the amount of resources consumed by flowchart 200.

In step 212, second metadata is fetched via the API service. For example, API manager 350 may be configured to transmit a metadata request, for one folder at a time, until a limit is met, to API services 142 of cloud based file hosting system 140. Each metadata request may indicate a child folder ID 326 that is associated with a folder type child of the immediate children of the first folder. API services 142 may be configured to respond to each request by transmitting the requested second metadata 336. The second metadata 336 may each be associated with sub-files and/or sub folders, if any, of the folder type children of the immediate children of the first folder.

In step 214, respective second fetched metadata is enqueued in the second persistent queue. For example, queue manager 340 is configured to create a third work item 334 for respective second metadata of each child of each folder of the immediate children of the first folder for which metadata was retrieved, and insert each respective second metadata 336 into a third work item 334. Queue manager 340 is further configured to enqueue each third work item 334 into second persistent queue 130.

In step 216, as described in more detail below, fetching and enqueuing of metadata may be repeated for additional children of the first folder. For example, as long as additional generations of child folders of the first folder are available to scan, and a limit for scanning has not been met, API manager 350 may be configured to fetch metadata of files and folders, create a metadata work item for each file and folder, enqueue the metadata work item(s) in second persistent queue 130, and update the first work item 320 with additional child folder IDs 326.

As a result of performing flowchart 200, the second persistent queue 130 may comprise a work item for each sub-file and each sub-folder for one or more generations of children of the first folder. Each of the work metadata items may comprise metadata associated with its respective sub-file or sub-folder. In some embodiments, the work items of the second persistent queue 130 may be dequeued and fed into a pipeline that may utilize the metadata for various functions. For example, the activity performed on the first folder and/or one or more generations of children of the first folder may be analyzed and compared to policies to find policy violations.

In some embodiments, rather than receiving a folder event for activities detected in a first folder that is stored in cloud based file hosting system 140 (as described in step 202), VM node 110 may receive a first file event for activities detected with respect to a file stored in the cloud based file hosting system 140. Since the first file does not have any children, the method may have a single iteration of fetching metadata from cloud based file hosting system 140. For example, queue manager 340 may be configured to create a first work item comprising a first file ID for the first file and enqueue the first work item in first persistent queue 120. Queue manager 340 may dequeue the first work item from first persistent queue 120, and API manager 350 may request metadata of the first file based on the first file ID in the first work item. API services 142 may access the requested metadata based on the first file ID, and transmit the requested metadata to API manager 350. Queue manager 340 may be configured to enqueue the metadata of the first file into a work item in second persistent queue 130. No further repetitions are required since the first file does not have children.

Figure 4:
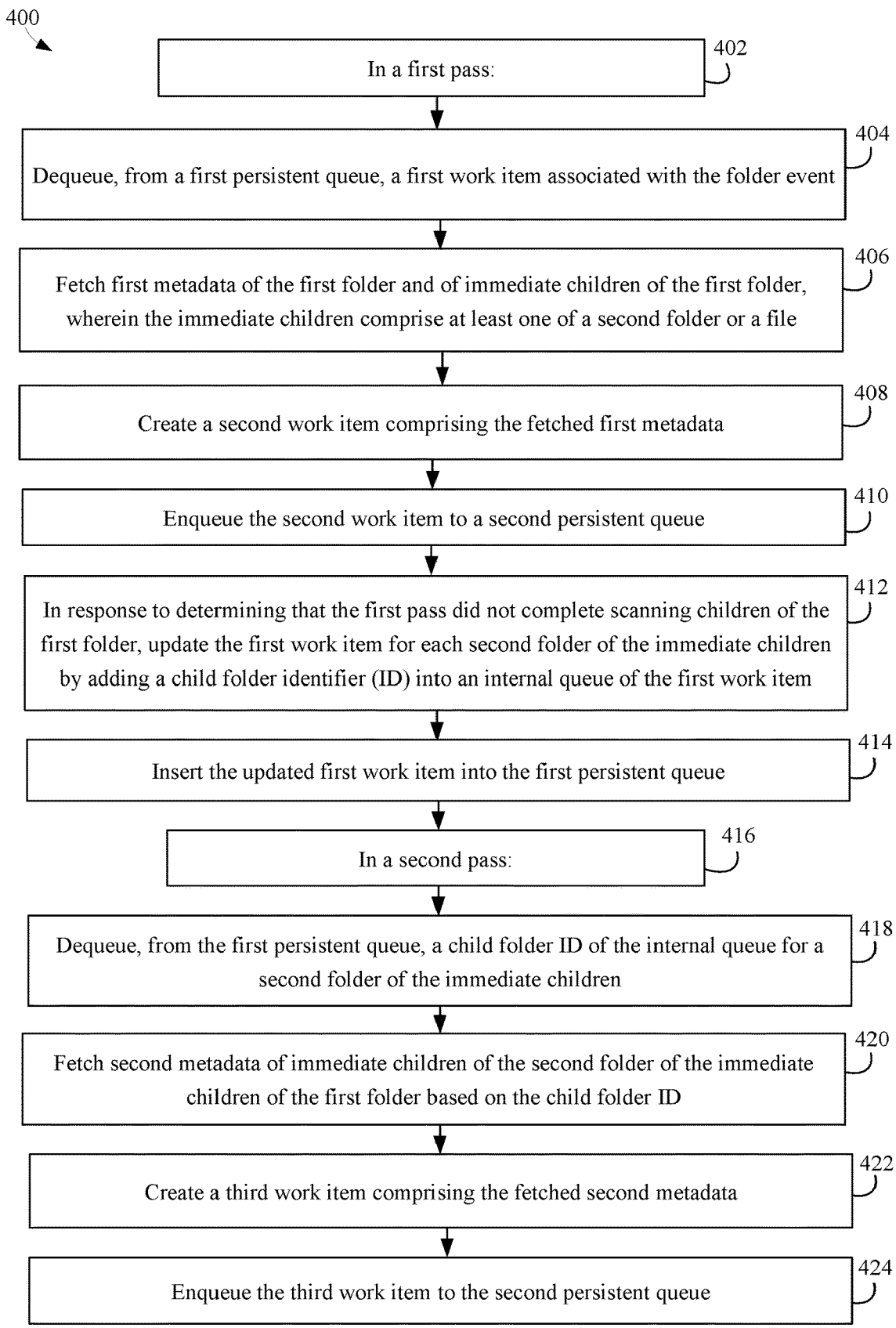
FIG. 4 is a flowchart of a method in a VM node for performing a breadth first search for file and folder metadata in a file hosting system, and enqueuing the metadata in a persistent queue, according to an example embodiment.

VM node 110 may operate in various ways to perform its functions. For instance, FIG. 4 is a flowchart 400 of a method in a VM node for performing a breadth first search for file and folder metadata in a file hosting system, and enqueuing the metadata in a persistent queue, according to an example embodiment. In an embodiment, VM node 110 may operate according to flowchart 400. Flowchart 400 is described as follows with reference to FIGS. 1 and 3.

Flowchart 400 begins with step 402. Step 402 is a start step for a first pass in flowchart 400. For example, aspects of one or more steps in the first pass may be repeated in one or more additional passes.

In step 404, a first work item that is associated with a folder event is dequeued from a first persistent queue. For example, a first folder (or root folder) is stored in cloud based file hosting system 140. The first folder may have immediate children that may comprise one or more folders and/or one or more files. Each immediate child that is a folder, may comprise another generation of children of the first folder (e.g., grandchildren of the first folder), which may include one or more files and/or one or more folders, and so on for any additional generations of files and/or folders descended from the first folder. First work item 320 may be associated with a folder event that occurred relative to the first folder, where an activity associated with the first folder may have triggered the folder event. First work item 320 may comprise first folder ID 322 that may be associated with the first folder and was received in the first folder event. Queue manager 340 may dequeue first work item 320 from first persistent queue 120.

In step 406, first metadata of the first folder and of immediate children of the first folder are fetched, where the immediate children comprise at least one of a second folder or a file. For example, API manager 350 may be configured to access API services 142 of cloud based file hosting system 140 and utilize first folder ID 322 to request metadata that is associated with the first folder and metadata associated with each of the immediate children of the first folder. The immediate children may comprise sub-files and/or sub-folders relative to the first folder. Each of the immediate children of the first folder that is a folder may be referred to as a second folder. API manager 350 may be configured to receive the requested metadata from API services 142.

In step 408, a second work item comprising the fetched first metadata may be created. For example, for the first folder, and for each of the immediate children of the first folder, queue manager 340 may be configured to create a respective second work item 330. Each of the respective second work items 330 may include fetched metadata shown as first meta data 332 that corresponds to the respective first folder or a respective immediate child of the first folder.

In step 410, the second work item may be enqueued to a second persistent queue. For example, queue manager 340 may enqueue each respective second work item 330 to second persistent queue 130. Although there are three second work items 330 shown second persistent queue 130, there may be more or fewer second work items 330 in second persistent queue 130 depending on the number of immediate children of the first folder.

In step 412, in response to determining that the first pass did not complete scanning children of the first folder, the first work item may be updated for each second folder of the immediate children of the first folder by adding a folder identifier (ID) into an internal queue of the first work item. For example, if any of the immediate children of the first folder is a folder (i.e., a second folder), there may be another generation of children within the second folder(s) to scan for metadata. Queue manager 340 may be configured to determine whether there are additional children of the first folder to be scanned, and if so, may update first work item 320 by inserting a respective child folder ID 326, for each of the immediate children of the first folder that is a second folder, into internal queue 324 of work item 320. Each of the respective child folder IDs 326 may be utilized to access metadata associated with children of the corresponding second folder in cloud based file hosting system 140. Although there are three child folder IDs 326 shown in internal queue 324, there may be more or fewer than three child folder IDs 326 depending on the number of immediate children of the first folder that are second folders.

In step 414, the updated first work item may be inserted into the first persistent queue. For example, when there are more children to scan for metadata in cloud based file hosting system 140, queue manager 340 may be configured to enqueue the updated first work item 320 comprising internal queue 324 to first persistent queue 120.

Step 416 is a step for initiating a second pass in flowchart 400. For example, aspects of one or more steps in the second pass may be repeated in one or more subsequent passes.

In step 418, a child folder ID of the internal queue for a second folder of the immediate children may be dequeued from the first persistent queue. For example, as described above, each of the immediate children of the first folder that is a folder may be referred to as a second folder. Each of the child folder IDs 326 of internal queue may be associated with a second folder. Queue manager 340 may be configured to dequeue a child folder ID 326 from internal queue 324 of first work item 320 in first persistent queue 120.

In step 420, second metadata of immediate children of the second folder of the immediate children of the first folder may be fetched based on the child folder ID. For example, API manager 350 may be configured to access API services 142 of cloud based file hosting system 140, and for each second folder (e.g., one second folder at a time until a scanning limit may be met), utilize a corresponding child folder ID 326 to request second metadata for each immediate child of the second folder (e.g., the children of a second folder are grandchildren of the first folder, and second metadata is fetched for each grandchild of the first folder until a limit may be met). The immediate children of the second folders may comprise one or more folders and/or one or more files. API manager 350 may be configured to receive the requested second metadata from API services 142.

In step 422, a third work item comprising the fetched second metadata may be created. For example, queue manager 340 may be configured to create a third work item for each received second metadata associated with a respective immediate child of each second folder.

In step 424, the third work item is enqueued to the second persistent queue. For example, queue manager 340 may be configured to enqueue each of the third work items comprising second metadata of a respective immediate child of each second folder to the second persistent queue 130.

Figure 5:
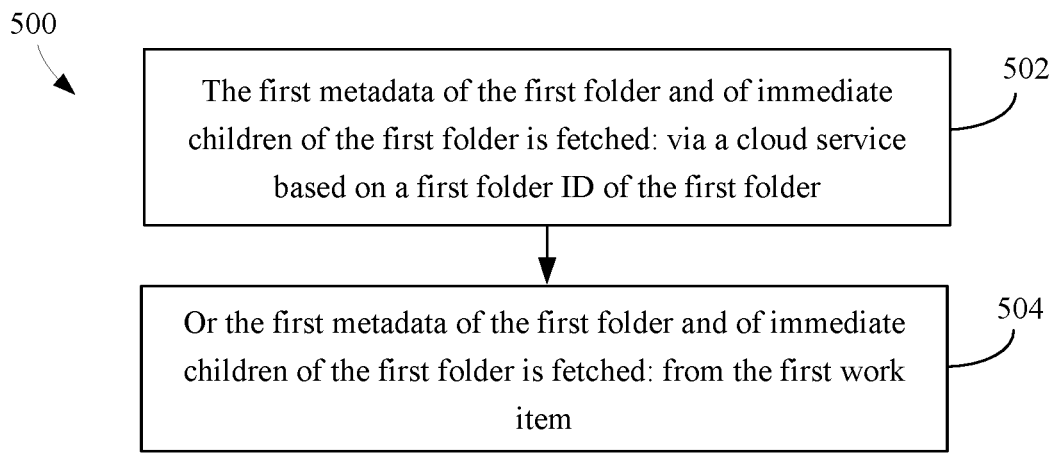
FIG. 5 is a flowchart of a method for fetching metadata of a folder and immediate children of the folder, according to an example embodiment.

API server 350 and queue manager 340 may operate in various ways to perform their functions. For instance, FIG. 5 is a flowchart 500 of a method for fetching metadata of a folder and immediate children of the folder, according to an example embodiment. Flowchart 500 may be performed as part of flowchart 400 (FIG. 4), such as during step 406. In an embodiment, API manager 350 and/or queue manager 340 may operate according to flowchart 500. Flowchart 500 is described as follows with reference to FIGS. 1 and 3.

Flowchart 500 begins with step 502. In step 502, the first metadata of the first folder and of immediate children of the first folder is fetched via a cloud service based on a first folder ID of the first folder. For example, as described above, API manager 350 may be configured to access API services 142, and utilizing first folder ID 322, retrieve metadata for the first folder and the immediate children of the first folder including one or more files and/or one or more folders.

In step 504, alternatively or in addition, the first metadata of the first folder and of immediate children of the first folder is fetched from the first work item. For example, in some embodiments, one or more of the cloud based file hosting systems 140 may be configured to send the first metadata for the first folder and/or for one or more of the immediate children of the first folder within the folder event received for the first folder (e.g., an event resulting from an activity associated with the first folder in cloud based file hosting system 140). In such an embodiment, the first metadata may be included in first work item 320 or may be stored in memory. Queue manager 340 may be configured to dequeue first work item 320 and retrieve the first metadata from first work item 320 or from memory.

Figure 6:
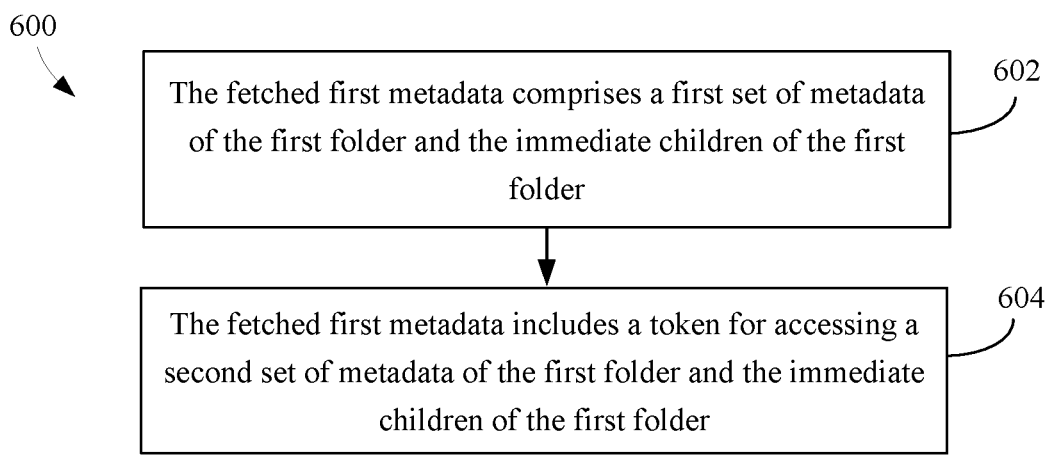
FIG. 6 is a flowchart of a method for fetching metadata in multiple sets of the metadata, according to an example embodiment.

API server 350 and queue manager 340 may operate in various ways to perform their functions. For instance, FIG. 6 is a flowchart 600 of a method for fetching metadata in multiple sets of the metadata, according to an example embodiment. Flowchart 600 may be performed as part of flowchart 400 (FIG. 4), such as during step 402. In an embodiment, API server 350 and queue manager 340 may operate according to flowchart 600. Flowchart 600 is described as follows with reference to FIGS. 1 and 3.

Flowchart 600 begins with step 602. In step 602, the fetched first metadata comprises a first set of metadata of the first folder and the immediate children of the first folder. For example, in some embodiments, API services 142 of cloud based file hosting system 140 may be configured to transmit first metadata associated with the first folder and the immediate children of the first folder in one or more sets to API manager 350, each set comprising a portion of the first metadata. The sets may be transmitted via multiple separate transmissions (e.g., to manage usage of scanning resources and reduce latency in the system). Similarly, portions of second metadata may be transmitted by API services 142 to API manager 350 in multiple sets. In some embodiments, a set of metadata may be transmitted as a page of metadata and the amount of metadata allowed per page may be limited. In some embodiments, the limit may be specified and/or controlled by cloud based file hosting system 140, or by cloud server 102. In this manner, system 300 may honor throttling mechanism policies of different API service 140 providers. In some embodiments, scan limit parameters 360 may comprise a parameter for the number of metadata elements that may be included in the transmission of a page.

In step 604, the fetched first metadata includes a token for accessing a second set of metadata of the first folder and the immediate children of the first folder. For example, when API services 142 transmits first metadata in one or more sets of first metadata, API services may be configured to include a token with each set having a subsequent set to follow in another transmission. API manager 350 may be configured to include the token in a request for a next set of first metadate to fetch the next set. Similarly, additional fetched metadata, such as fetched second metadata, may be received in sets with tokens for any subsequent sets to be transmitted separately.

Figure 7:
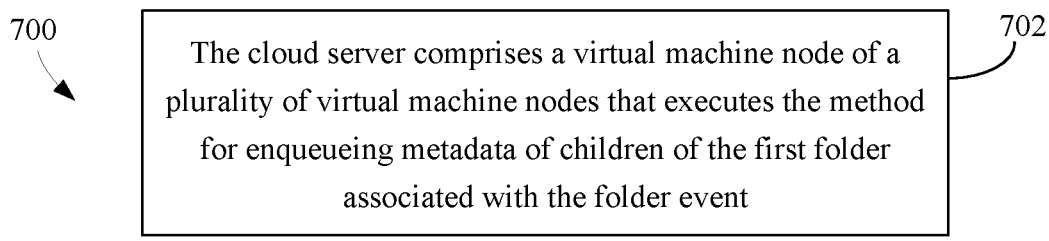
FIG. 7 is a flowchart comprising a step for enqueuing metadata of children of a first folder associated with a folder event, according to an example embodiment.

VM node 110 may operate in various ways to perform its functions. For instance, FIG. 7 is a flowchart 700 comprising a step for enqueuing metadata of children of a first folder associated with a folder event, according to an example embodiment. VM node 110 may operate according to flowchart 700. Flowchart 700 is described as follows with reference to FIGS. 1 and 3.

Flowchart 700 includes step 702. In step 702, the cloud server comprises a virtual machine node of a plurality of virtual machine nodes that executes the method for enqueuing metadata of children of the first folder associated with the folder event. For example, cloud server 102 may comprise a plurality of VM nodes such as VM node 110, where each of the plurality of VM nodes may be configured to execute the steps of all or a portion of the flow charts 200, 400, 500, 600, 700, 800, 900, 1000, and/or 1100.

Figure 8:
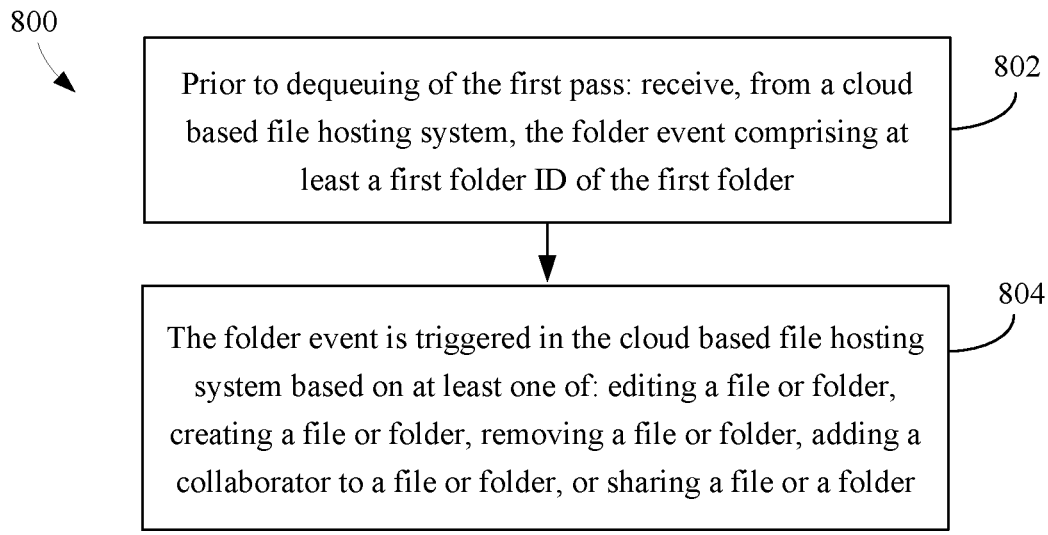
FIG. 8 is a flowchart of a method for receiving a folder event from a cloud based file hosting system, according to an example embodiment.

API manager 350 may operate in various ways to perform its functions. For instance, FIG. 8 is a flowchart 800 of a method for receiving a folder event from a cloud based file hosting system, according to an example embodiment. Flowchart 800 may be performed as part of flowchart 400 (FIG. 4), such as before step 402. In an embodiment, API manager 350 may operate according to flowchart 800. Flowchart 800 is described as follows with reference to FIGS. 1 and 3.

Flowchart 800 begins with step 802. In step 802, prior to said dequeuing of said first pass: the folder event comprising at least a first folder ID of the first folder is received from a cloud based file hosting system. For example, prior to dequeuing first work item 320 from first persistent queue 120, where first work item 320 is associated with the first folder and the first folder event, the first folder event is received from cloud based file hosting system 140 via API services 142. The folder event may comprise first folder ID 322, which is associated with the first folder.

In step 804, the folder event is triggered in the cloud based file hosting system based on at least one of: editing a file or folder, creating a file or folder, removing a file or folder, adding a collaborator to a file or folder, or sharing a file or a folder. For example, the folder event may be triggered in cloud based file hosting system 140 based on: editing a file or folder, creating a file or folder, removing a file or folder, adding a collaborator to a file or folder, or sharing a file or a folder, where the file or folder may comprise a first file or the first folder.

Figure 9:
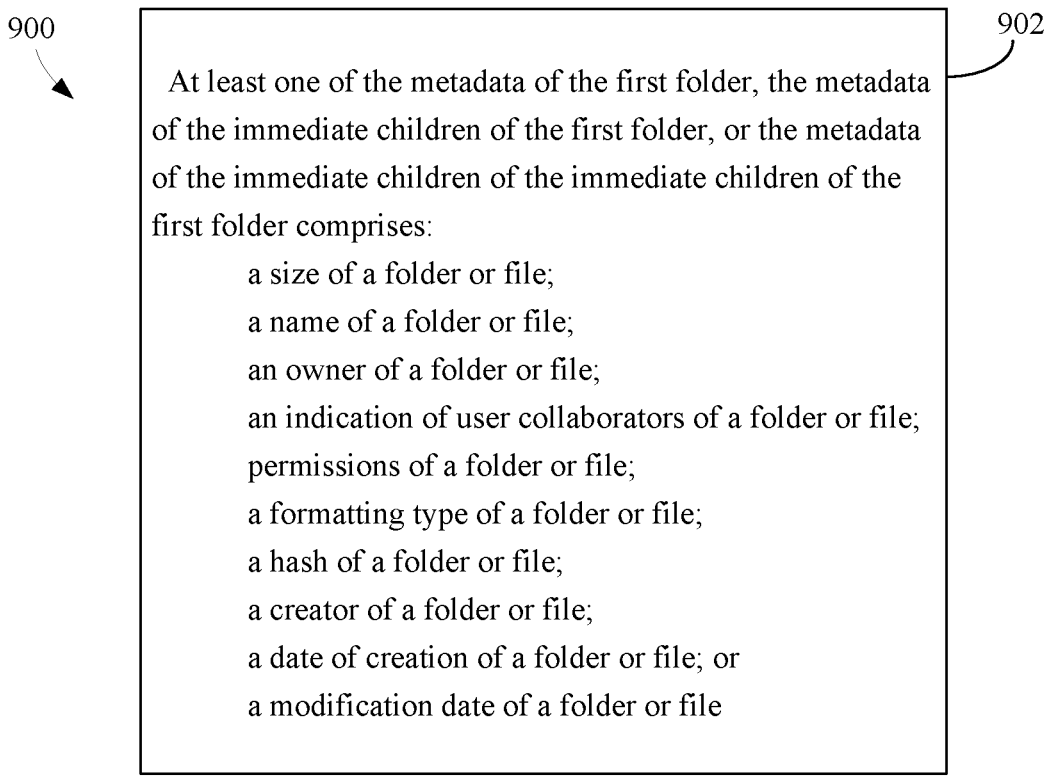
FIG. 9 is a flowchart of a method for queueing metadata of a folder or a file, according to an example embodiment.

Second persistent queue 130 may operate in various ways to perform its functions. For instance, FIG. 9 is a flowchart 900 of a method for queueing metadata of a folder or a file, according to an example embodiment. Flowchart 900 may be performed as part of flowchart 400 (FIG. 4), such as after step 404 and/or after step 418. In an embodiment, second persistent queue 130 may operate according to flowchart 900. Flowchart 900 is described as follows with reference to FIGS. 1 and 3.

Flowchart 900 includes step 902. In step 902, at least one of the metadata of the first folder, the metadata of the immediate children of the first folder, or the metadata of the immediate children of the immediate children of the first folder comprises: a size of a folder or file, a name of a folder or file, an owner of a folder or file, an indication of user collaborators of a folder or file, permissions of a folder or file, a formatting type of a folder or file, a hash of a folder or file, a creator of a folder or file, a date of creation of a folder or file, or a modification date of a folder or file.

Figure 10:
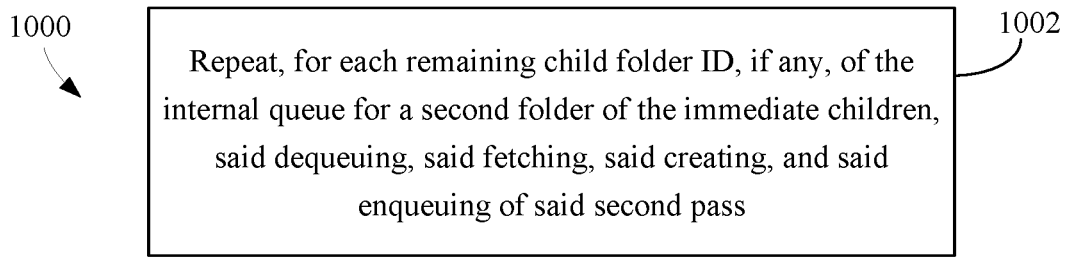
FIG. 10 is a flowchart of a method for repeating steps for enqueuing metadata associated with a folder event, according to an example embodiment.

API server 350 and queue manager 340 may operate in various ways to perform their functions. For instance, FIG. 10 is a flowchart 1000 of a method for repeating steps for enqueuing metadata associated with a folder event, according to an example embodiment. Flowchart 1000 may be performed as part of flowchart 400 (FIG. 4), such as after step 416. In an embodiment, API server 350 and queue manager 340 may operate according to flowchart 1000. Flowchart 1000 is described as follows with reference to FIGS. 1 and 3.

Flowchart 1000 includes step 1002. In step 1002, for each remaining child folder ID (if any) of the internal queue for a second folder of the immediate children, repeating said dequeuing, said fetching, said creating, and said enqueuing of said second pass. For example, as described above, internal queue 324 of work item 320 in first persistent queue 120, may comprise one or more child folder IDs 326 that each correspond to one of the second folders (i.e., immediate folder children of the first folder). Although there are three child folder IDs 326 shown in internal queue 324, there may be more or fewer child folder IDs 326 in the queue depending on how many of the immediate children of the first folder are folders (i.e., second folders). If after the second pass (described with respect to flow chart 400 in step 416), there are any child folder IDs 326 remaining in internal queue 324 (e.g., and a scanning limit has not been met), then steps 418, 420, 422, and 424 of flow chart 400 may be repeated for each remaining child folder ID 326 remaining in internal queue 324. If none of the children of the first folder are folders, then queue manager 340 may not have created first work item 320 with internal queue 324.

Figure 11:
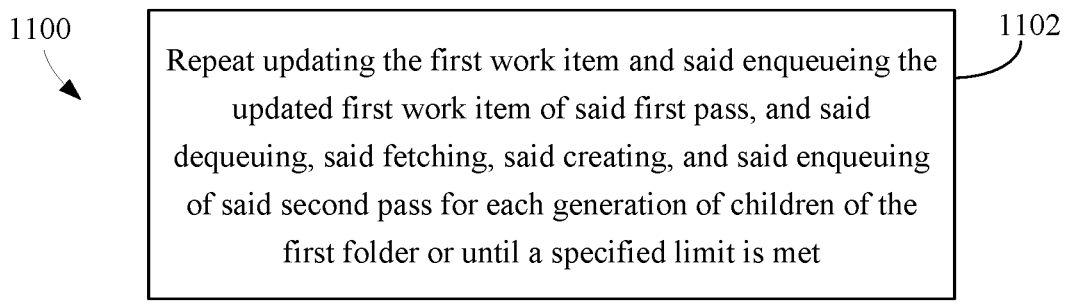
FIG. 11 is a flowchart of a method for repeating steps for enqueuing metadata associated with a folder event for each generation of children of a first folder or until a specified limit is met, according to an example embodiment.

Queue manager 340 and API manager 350 may operate in various ways to perform their functions. For instance, FIG. 11 is a flowchart 1100 of a method for repeating steps for enqueuing metadata associated with a folder event for each generation of children of a first folder or until a specified limit is met, according to an example embodiment. Flowchart 1100 may be performed as part of flowchart 400 (FIG. 4), such as after step 410. In an embodiment, queue manager 340 and API manager 350 may operate according to flowchart 1100. Flowchart 1100 is described as follows with reference to FIGS. 1 and 3.

Flowchart 1100 includes step 1102. In step 1102, said updating the first work item and said enqueuing the updated first work item of said first pass, and said dequeuing, said fetching, said creating, and said enqueuing of said second pass is repeated for each generation of children of the first folder or until a specified limit is met. For example, queue manager 340 and API manager 350 may perform steps 412, 414, 416, 418, 420, 422, and 424 for each folder that is an immediate child of a folder in any generation of children under the first folder. In some embodiments, scan limit parameters 360 may be configured in VM node 110. Scan limit parameters 360 may specify limits or criteria for ending the scanning process for fetching metadata of the first folder and children of the first folder. For example, the scan limit parameters may indicate when to discontinue scanning for metadata in order to conserve resources or avoid latency in VM node 110, cloud based file hosting system 140, or the communication channels between them. In some embodiments, the scanning for metadata may continue beyond a configured limit, to complete the scanning of files in a folder. For example, at the end of scanning all of the files in a folder, the number of files scanned may be compared to a scan limit parameter 360, and if the limit has been reached, the scanning may stop.

Figure 12:
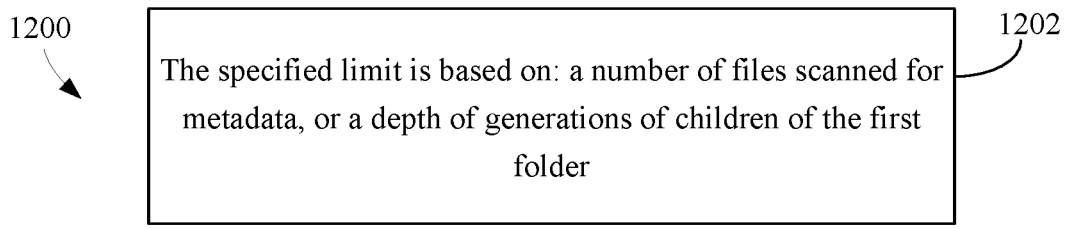
FIG. 12 is a flowchart of a method for limiting file and folder scans for fetching metadata, according to an example embodiment.

Queue manager 340 and API manager 350 may operate in various ways to perform their functions. For instance, FIG. 12 is a flowchart 1200 of a method for limiting file and folder scans for fetching metadata, according to an example embodiment. Flowchart 1200 may be performed as part of flowchart 400 (FIG. 4), such as after step 404. In an embodiment, queue manager 340 and API manager 350 may operate according to flowchart 1200. Flowchart 1200 is described as follows with reference to FIGS. 1 and 3.

Flowchart 1200 includes step 1202. In step 1202, the specified limit is based on: a number of files scanned for metadata, or a depth of generations of children of the first folder. For example, scan limit parameters 360 may be based on the depth of a scan (e.g., the number of generations of children of the first folder to scan for metadata in cloud based file hosting system 140). Alternatively or in addition, scan limit parameters 360 may be based on the number of the number of files or folders that are allowed to be scanned for metadata in cloud based file hosting system 140, for example, in response to the folder event for the first folder received from cloud based file hosting system 140.

In general, the following limitations may be set in systems 100 and 300: (1) an upper bound for the total number of scanned sub-files and sub-folders of a first folder, (2) limit of depth (from the first folder) to scan, (3) dynamically update the upper bound to allow completing a full-scan of a sub-folder (e.g., avoiding a partial scan, if possible), (4) breaking a folder scan into iterations of smaller scans (e.g., pages of metadata), each of them may be limited to a fixed number of API calls to API services 142.

Several technical improvements may be achieved by systems 100 and 300. For example, by enforcing the above described limitations on the process of enqueuing metadata into second persistent queue 130 (i.e., metadata queue), VM nodes 110 of cloud server 102 may be configured to handle thousands of events per second with low latency. Also, VM Nodes 110 may be configured to handle events from the same drive of a cloud based file hosting system 140 in parallel. Furthermore, resources may be conserved by splitting the bandwidth (e.g., API calls per second) evenly among different events to avoid starvation.

The methods described herein may be generic to most software as a service systems that support a file hosting service. Moreover, system 100 and 300 may honor throttling mechanism policies of different API services providers.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100 and 300 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 13:
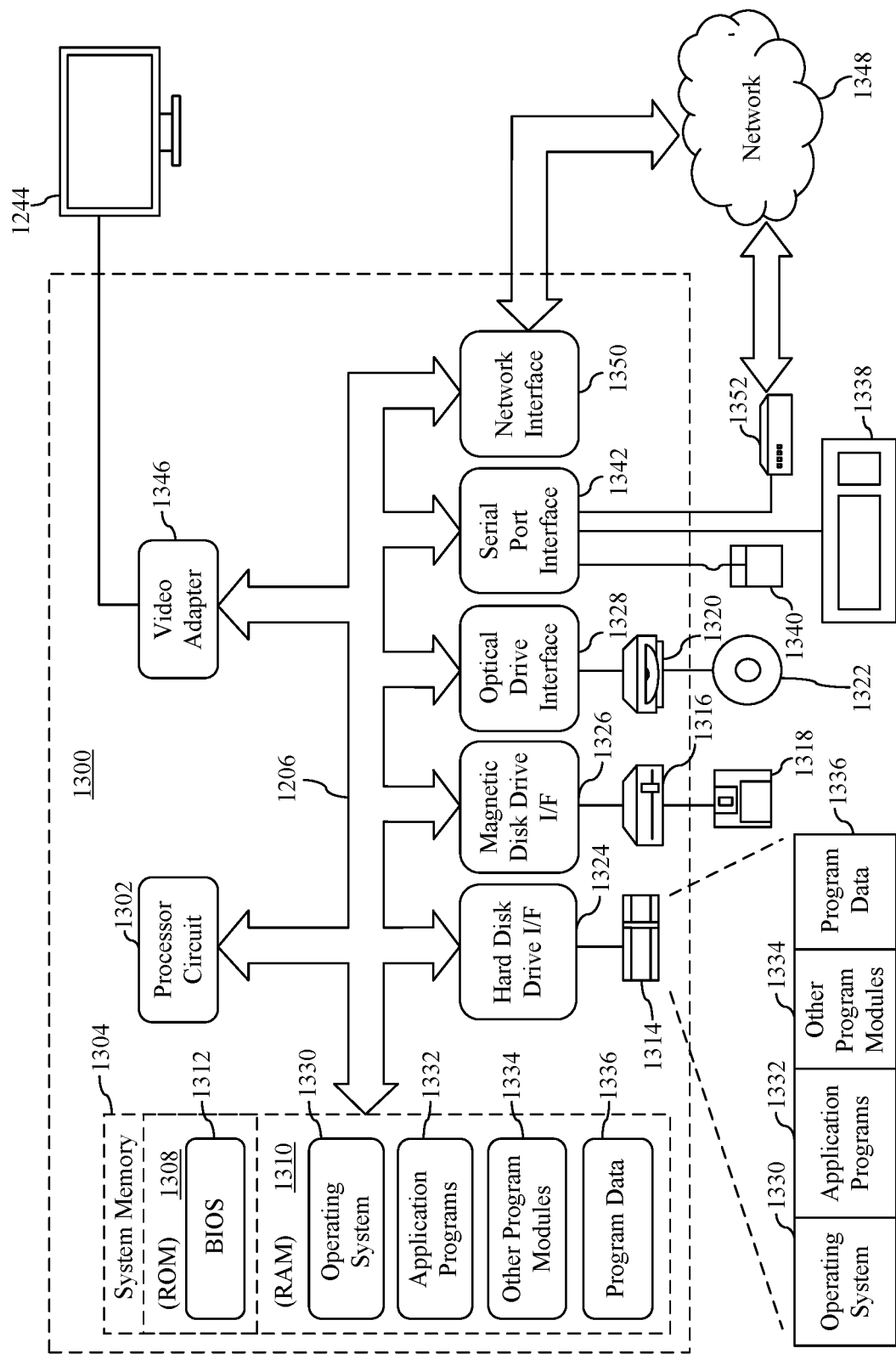
FIG. 13 is a block diagram of an example processor-based computer system that may be used to implement various embodiments.

FIG. 13 is a block diagram of an example processor-based computer system 1300 that may be used to implement various embodiments. Cloud server 102, virtual machine nodes 110, and cloud based file hosting systems 140 may include any type of computing device, mobile or stationary, such as a desktop computer, a server, a video game console, etc. For example, cloud server 102, virtual machine nodes 110, and cloud based file hosting systems 140 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Cloud server 102, virtual machine nodes 110, and cloud based file hosting systems 140, may each be implemented in one or more computing devices containing features similar to those of computing device 1300 in stationary or mobile computer embodiments and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing cloud server 102, virtual machine nodes 110, cloud based file hosting systems 140, first persistent queue 120, second persistent queue 130, API services 142, queue manager 340, API manager 350, internal queue 324, any one or more of flowcharts 200, 400, 500, 600, 700, 800, 900, 1000, 1100, 1200 (including any step thereof), and/or further embodiments described herein. Program data 1336 may include, first work item 320, first folder ID 322, updated first work item 320, internal queue 324, child folder IDs 326, second work items 330, first metadata 332, third work items 334, second metadata 336, and scan limit parameters 360, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system in a cloud server for enqueuing metadata of children of a first folder associated with a folder event comprises one or more processors, and one or more memory devices that store program code to be executed by the one or more processors. The program code comprises a queue manager that is configured to, in a first pass, dequeue, from a first persistent queue, a first work item associated with the folder event. An API manager is configured to, in the first pass, fetch first metadata of the first folder and of immediate children of the first folder, where the immediate children comprise at least one of a folder or a file. The queue manager is further configured to, in the first pass: create a second work item comprising the fetched first metadata, enqueue the second work item to a second persistent queue, update the first work item for each folder of the immediate children by adding a child folder identifier (ID) into an internal queue of the first work item, and insert the updated first work item into the first persistent queue. In a second pass, the queue manager is further configured to dequeue, from the first persistent queue, a child folder ID of the internal queue for a second folder of the immediate children. The API manager is further configured to, in the second pass, fetch second metadata of immediate children of the second folder of the immediate children of the first folder based on the child folder ID. The queue manager is further configured to, in the second pass: create a third work item comprising the fetched second metadata and enqueue the third work item to the second persistent queue.

In an embodiment of the foregoing system, the first metadata of the first folder and of immediate children of the first folder is fetched via a cloud service based on a first folder ID of the first folder, or from the first work item.

In an embodiment of the foregoing system, the fetched first metadata comprises a first set of metadata of the first folder and the immediate children of the first folder, and the fetched first metadata includes a token for accessing a second set of metadata of the first folder and the immediate children of the first folder.

In an embodiment of the foregoing system, the cloud server comprises a virtual machine node of a plurality of virtual machine nodes that executes the method for enqueuing metadata of children of the first folder associated with the folder event.

In an embodiment of the foregoing system the queue manager is further configured to, prior to said dequeuing of said first pass, receive, from a cloud-based file system, the folder event comprising at least a first folder ID of the first folder, where the folder event is triggered in the cloud-based file system based on at least one of: editing a file or folder, creating a file of folder, removing a file or folder, adding a collaborator to a file or folder, or sharing a file or a folder.

In an embodiment of the foregoing system, at least one of the metadata of the first folder, the metadata of the immediate children of the first folder, or the metadata of the immediate children of the immediate children of the first folder comprises: a size of a folder or file, a file name of a folder or file, an owner of a folder or file, an indication of user collaborators of a folder or file, permissions of a folder or file, a formatting type of a folder or file, a hash of a folder or file, a creator of a folder or file, a date of creation of a folder or file, or a modification date of a folder or file.

In an embodiment of the foregoing system, the queue manager and the API manager are further configured to: repeat, for each remaining child folder ID, if any, of the internal queue for a folder of the immediate children, said dequeuing, said fetching, said creating, and said enqueuing of said second pass.

In an embodiment of the foregoing system, the queue manager and the API manager are further configured to repeat said dequeuing, said fetching, said creating, and said enqueuing of said second pass for each generation of children of the first folder or until a specified limit is met.

In an embodiment of the foregoing system, the specified limit is based on a number of files scanned for metadata or a depth of generations of children of the first folder.

In an embodiment, a method in a cloud server for enqueuing metadata of children of a first folder associated with a folder event includes, in a first pass: dequeuing, from a first persistent queue, a first work item associated with the folder event, fetching first metadata of the first folder and of immediate children of the first folder, where the immediate children comprise at least one of a folder or a file, creating a second work item comprising the fetched first metadata, enqueuing the second work item to a second persistent queue, updating the first work item for each folder of the immediate children by adding a child folder identifier (ID) into an internal queue of the first work item, and inserting the updated first work item into the first persistent queue. In a second pass, the method further includes dequeuing, from the first persistent queue, a child folder ID of the internal queue for a second folder of the immediate children, fetching second metadata of immediate children of the second folder of the immediate children of the first folder based on the child folder ID, creating a third work item comprising the fetched second metadata, and enqueuing the third work item to the second persistent queue.

In an embodiment of the foregoing method, the first metadata of the first folder and of immediate children of the first folder is fetched via a cloud service based on a first folder ID of the first folder or from the first work item.

In an embodiment of the foregoing method, the fetched first metadata comprises a first set of metadata of the first folder and the immediate children of the first folder, and the fetched first metadata includes a token for accessing a second set of metadata of the first folder and the immediate children of the first folder.

In an embodiment of the foregoing method, the cloud server comprises a virtual machine node of a plurality of virtual machine nodes that executes the method for enqueuing metadata of children of the first folder associated with the folder event.

In an embodiment of the foregoing method, prior to said dequeuing of said first pass, the method further comprises receiving, from a cloud-based file system, the folder event comprising at least a first folder ID of the first folder, where the folder event is triggered in the cloud-based file system based on at least one of: editing a file or folder, creating a file of folder, removing a file or folder, adding a collaborator to a file or folder, or sharing a file or a folder.

In an embodiment of the foregoing method, at least one of the metadata of the first folder, the metadata of the immediate children of the first folder, or the metadata of the immediate children of the immediate children of the first folder comprises: a size of a folder or file, a file name of a folder or file, an owner of a folder or file, an indication of user collaborators of a folder or file, permissions of a folder or file, a formatting type of a folder or file, a hash of a folder or file, a creator of a folder or file, a date of creation of a folder or file, or a modification date of a folder or file.

In an embodiment of the foregoing method, the method further comprises repeating, for each remaining child folder ID, if any, of the internal queue for a folder of the immediate children: said dequeuing, said fetching, said creating, and said enqueuing of said second pass.

In an embodiment of the foregoing method, the method further comprises repeating said dequeuing, said fetching, said creating, and said enqueuing of said second pass, for each generation of children of the first folder or until a specified limit is met.

In an embodiment, a computer-readable medium that has program code recorded thereon that when executed by at least one processor causes the at least one processor to perform a method for enqueuing metadata of children of a first folder associated with a folder event. The method comprising, in a first pass: dequeuing, from a first persistent queue, a first work item associated with the folder event, fetching first metadata of the first folder and of immediate children of the first folder, where the immediate children comprise at least one of a folder or a file, creating a second work item comprising the fetched first metadata, enqueuing the second work item to a second persistent queue, updating the first work item for each folder of the immediate children by adding a child folder identifier (ID) into an internal queue of the first work item, and inserting the updated first work item into the first persistent queue. In a second pass, the method further comprises: dequeuing, from the first persistent queue, a child folder ID of the internal queue for a second folder of the immediate children, fetching second metadata of immediate children of the second folder of the immediate children of the first folder based on the child folder ID, creating a third work item comprising the fetched second metadata, and enqueuing the third work item to the second persistent queue.

In an embodiment of the foregoing computer-readable medium, the method further comprises repeating, for each remaining child folder ID, if any, of the internal queue for a folder of the immediate children: said dequeuing, said fetching, said creating, and said enqueuing of said second pass.

In an embodiment of the foregoing computer-readable medium, the method further comprises repeating said dequeuing, said fetching, said creating, and said enqueuing of said second pass, for each generation of children of the first folder or until a specified limit is met.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system in a cloud server for enqueuing metadata of children of a first folder associated with a folder event, the system comprising:
one or more processors; and
one or more memory devices that store program code to be executed by the one or more processors, the program code comprising:
a queue manager configured to:
in a first pass:
dequeue, from a first persistent queue, a first work item associated with the folder event;
an API manager configured to:
in the first pass:
fetch first metadata of the first folder and of immediate children of the first folder, wherein the immediate children comprise at least one of a second folder or a file;
the queue manager further configured to:
in the first pass:
create a second work item comprising the fetched first metadata;
enqueue the second work item to a second persistent queue;
in response to determining that the first pass did not complete scanning children of the first folder, update the first work item for each second folder of the immediate children by adding a child folder identifier (ID) into an internal queue of the first work item; and insert the updated first work item into the first persistent queue; and in a second pass:

dequeue, from the first persistent queue, a child folder ID of the internal queue for a second folder of the immediate children;

the API manager further configured to:

in the second pass:

fetch second metadata of immediate children of the second folder of the immediate children of the first folder based on the child folder ID;

the queue manager further configured to:

in the second pass:

create a third work item comprising the fetched second metadata; and enqueue the third work item to the second persistent queue.

2. The system of claim 1, wherein the first metadata of the first folder and of immediate children of the first folder is fetched:

via a cloud service based on a first folder ID of the first folder; or from the first work item.

3. The system of claim 1, wherein:

the fetched first metadata comprises a first set of metadata of the first folder and the immediate children of the first folder; and the fetched first metadata includes a token for accessing a second set of metadata of the first folder and the immediate children of the first folder.

4. The system of claim 1, wherein the cloud server comprises a virtual machine node of a plurality of virtual machine nodes that executes the method for enqueuing metadata of children of the first folder associated with the folder event.

5. The system of claim 1, wherein the queue manager is further configured to:

prior to said dequeuing of said first pass:

receive, from a cloud based file hosting system, the folder event comprising at least a first folder ID of the first folder;

wherein the folder event is triggered in the cloud based file hosting system based on at least one of:

editing a file or folder, creating a file of folder, removing a file or folder, adding a collaborator to a file or folder, or sharing a file or a folder.

6. The system of claim 1, wherein at least one of the metadata of the first folder, the metadata of the immediate children of the first folder, or the metadata of the immediate children of the immediate children of the first folder comprises:

a size of a folder or file;

a name of a folder or file;

an owner of a folder or file;

an indication of user collaborators of a folder or file;

permissions of a folder or file;

a formatting type of a folder or file;

a hash of a folder or file;

a creator of a folder or file;

a date of creation of a folder or file; or a modification date of a folder or file.

7. The system of claim 1, wherein the queue manager and the API manager are further configured to:

repeat, for each remaining child folder ID, if any, of the internal queue for a second folder of the immediate children, said dequeuing, said fetching, said creating, and said enqueuing of said second pass.

8. The system of claim 7, wherein the queue manager and the API manager are further configured to:

repeat said update the first work item and said enqueue the updated first work item of said first pass, and said dequeue, said fetch, said create, and said enqueue of said second pass for each generation of children of the first folder or until a specified limit is met.

9. The system of claim 8, wherein the specified limit is based on:

a number of files scanned for metadata; or a depth of generations of children of the first folder.

10. A method in a cloud server for enqueuing metadata of children of a first folder associated with a folder event, the method including:

in a first pass:

dequeuing, from a first persistent queue, a first work item associated with the folder event;

fetching first metadata of the first folder and of immediate children of the first folder, wherein the immediate children comprise at least one of a second folder or a file;

creating a second work item comprising the fetched first metadata;

enqueuing the second work item to a second persistent queue;

in response to determining that the first pass did not complete scanning children of the first folder, updating the first work item for each second folder of the immediate children by adding a child folder identifier (ID) into an internal queue of the first work item; and inserting the updated first work item into the first persistent queue;

in a second pass:

dequeuing, from the first persistent queue, a child folder ID of the internal queue for a second folder of the immediate children;

fetching second metadata of immediate children of the second folder of the immediate children of the first folder based on the child folder ID;

creating a third work item comprising the fetched second metadata; and enqueuing the third work item to the second persistent queue.

11. The method of claim 10, wherein the first metadata of the first folder and of immediate children of the first folder is fetched:

via a cloud service based on a first folder ID of the first folder; or from the first work item.

12. The method of claim 10, wherein:

the fetched first metadata comprises a first set of metadata of the first folder and the immediate children of the first folder; and the fetched first metadata includes a token for accessing a second set of metadata of the first folder and the immediate children of the first folder.

13. The method of claim 10, wherein the cloud server comprises a virtual machine node of a plurality of virtual machine nodes that executes the method for enqueuing metadata of children of the first folder associated with the folder event.

14. The method of claim 10, wherein prior to said dequeuing of said first pass:
- receiving, from a cloud based file hosting system, the folder event comprising at least a first folder ID of the first folder;
- wherein the folder event is triggered in the cloud based file hosting system based on at least one of:
  - editing a file or folder,
  - creating a file of folder,
  - removing a file or folder,
  - adding a collaborator to a file or folder, or
  - sharing a file or a folder.

15. The method of claim 10, wherein at least one of the metadata of the first folder, the metadata of the immediate children of the first folder, or the metadata of the immediate children of the immediate children of the first folder comprises:
- a size of a folder or file;
- a name of a folder or file;
- an owner of a folder or file;
- an indication of user collaborators of a folder or file;
- permissions of a folder or file;
- a formatting type of a folder or file;
- a hash of a folder or file;
- a creator of a folder or file;
- a date of creation of a folder or file; or
- a modification date of a folder or file.

16. The method of claim 10, further comprising:
repeating, for each remaining child folder ID, if any, of the internal queue for a second folder of the immediate children, said dequeuing, said fetching, said creating, and said enqueuing of said second pass.

17. The method of claim 16, further comprising:
repeating said updating the first work item and said enqueuing the updated first work item of said first pass, and said dequeuing, said fetching, said creating, and said enqueuing of said second pass for each generation of children of the first folder or until a specified limit is met.

18. A computer-readable medium having program code recorded thereon that when executed by at least one processor causes the at least one processor to perform a method for enqueuing metadata of children of a first folder associated with a folder event, the method comprising:
in a first pass:
- dequeuing, from a first persistent queue, a first work item associated with the folder event;
- fetching first metadata of the first folder and of immediate children of the first folder, wherein the immediate children comprise at least one of a second folder or a file;
- creating a second work item comprising the fetched first metadata;
- enqueuing the second work item to a second persistent queue;
- in response to determining that the first pass did not complete scanning children of the first folder, updating the first work item for each second folder of the immediate children by adding a child folder identifier (ID) into an internal queue of the first work item; and
- inserting the updated first work item into the first persistent queue;

in a second pass:
- dequeuing, from the first persistent queue, a child folder ID of the internal queue for a second folder of the immediate children;
- fetching second metadata of immediate children of the second folder of the immediate children of the first folder based on the child folder ID;
- creating a third work item comprising the fetched second metadata; and
- enqueuing the third work item to the second persistent queue.

19. The computer-readable medium of claim 18, the method further comprising:
repeating, for each remaining child folder ID, if any, of the internal queue for a second folder of the immediate children, said dequeuing, said fetching, said creating, and said enqueuing of said second pass.

20. The computer-readable medium of claim 19, the method further comprising: repeating said updating the first work item and said enqueuing the updated first work item of said first pass, and said dequeuing, said fetching, said creating, and said enqueuing of said second pass for each generation of children of the first folder or until a specified limit is met.

* * * * *